US005403534A

United States Patent [19]

Kim

[11] Patent Number: 5,403,534

[45] Date of Patent: Apr. 4, 1995

[54] DISPOSABLE RAZOR

[75] Inventor: Jisu Kim, Yonkers, N.Y.

[73] Assignee: Tritec International Corporation, New York, N.Y.

[21] Appl. No.: 766,807

[22] Filed: Sep. 26, 1991

[51] Int. Cl.[6] .............................................. B32B 31/30

[52] U.S. Cl. ........................................ 264/249; 30/85; 264/173; 264/177.17; 29/451

[58] Field of Search .................... 30/85, 86; 16/110 R, 16/116 R; 264/173, 177.17, 249, 176.1; 76/DIG. 8; 29/451

[56] References Cited

U.S. PATENT DOCUMENTS

| | | | |
|---|---|---|---|
| 2,235,841 | 3/1941 | Monnet | 30/85 |
| 3,430,994 | 3/1969 | Keeler, II | 264/177.17 |
| 3,716,433 | 2/1973 | Plummer | 16/110 R |
| 4,619,799 | 10/1986 | Teerling | 264/173 |
| 4,949,457 | 8/1990 | Burout, III | 30/85 |
| 5,027,511 | 7/1991 | Miller | 30/85 |

FOREIGN PATENT DOCUMENTS

| | | |
|---|---|---|
| 2004793 | 6/1989 | Canada . |
| 53-105563 | 9/1978 | Japan . |
| 4-025453 | 1/1992 | Japan . |

*Primary Examiner*—Richard K. Seidel
*Assistant Examiner*—Hwei-Siu Payer
*Attorney, Agent, or Firm*—Brumbaugh, Graves, Donohue & Raymond

[57] ABSTRACT

A disposable razor having a rubberized handle comprising an extruded substantially rigid inner core of thermoplastic material and a covering layer comprising a compatible thermoplastic rubber coextrudable with the inner core.

4 Claims, 4 Drawing Sheets

60

DISPOSABLE RAZOR

BACKGROUND OF THE INVENTION

The present invention relates to wet shaving razors and, more particularly, to a disposable wet shaving razor having a "rubberized" handle for a more comfortable and secure grip.

Disposable wet shaving razors which are intended to be discarded after the shaving blade becomes too dull to provide an acceptable shave are in widespread use. In order for a disposable razor to be commercially feasible, its manufacturing cost must be kept at a minimum.

The desirability of providing a wet shaving razor with a rubberized handle which provides a more comfortable and secure grip, especially when held with wet and sometimes soapy hands, has been recognized. However, known techniques for fabricating wet shaving razors with rubberized handles have the drawback of being too costly to use in the manufacture of disposable razors. For example, U.S. Pat. No. 4,949,457 to C. J. Burout III discloses and claims a composite razor handle having a rigid inner core of thermoplastic material and a molded flexible, resilient covering layer. The flexible covering layer is formed by a separate molding process and attached to the rigid inner core, which is provided with elongated recesses to prevent the rotational slippage of the covering layer and notches for anchoring the covering layer to prevent it from peeling away from the core. Although the Burout patent states that the composite razor handle taught therein may be used in disposable as well as nondisposable razors, the additional molding and attachment steps required to form the flexible, resilient covering layer for the Burout razor handle would add significantly to the manufacturing cost of a razor. Therefore, use of the Burout razor handle in a disposable razor is disadvantageous, if not impractical.

Accordingly, a need clearly exists for a disposable razor having a rubberized handle which can be manufactured at low cost.

SUMMARY OF THE INVENTION

The foregoing need is substantially met by the present invention which in one aspect is a disposable razor having a shaving head having one or more shaving blades held in appropriate shaving position, and a rubberized handle attached to the shaving head comprising an extruded substantially rigid inner core of thermoplastic material and a flexible layer covering the rigid inner core formed with a compatible thermoplastic rubber coextrudable with the rigid inner core.

Another aspect of the present invention is a method for producing a disposable razor comprising the steps of forming a shaving head holding one or more shaving blades in appropriate shaving position, extruding a substantially rigid thermoplastic material, extruding a thermoplastic rubber compatible with the thermoplastic material, feeding the substantially rigid thermoplastic material and the thermoplastic rubber extrudates simultaneously into a coaxial extruder die so as to form a one-piece coextruded razor handle having an inner core of the substantially rigid thermoplastic material covered by a layer of the thermoplastic rubber, and attaching the shaving head to the coextruded razor handle.

BRIEF DESCRIPTION OF THE DRAWINGS

The invention will be better understood from the following detailed description of an exemplary embodiment thereof in conjunction with the accompanying drawings in which.

Throughout the figures of the drawings the same reference numerals or characters are used to denote like components or features of the illustrated disposable razor.

DETAILED DESCRIPTION OF THE INVENTION

Figure 1:
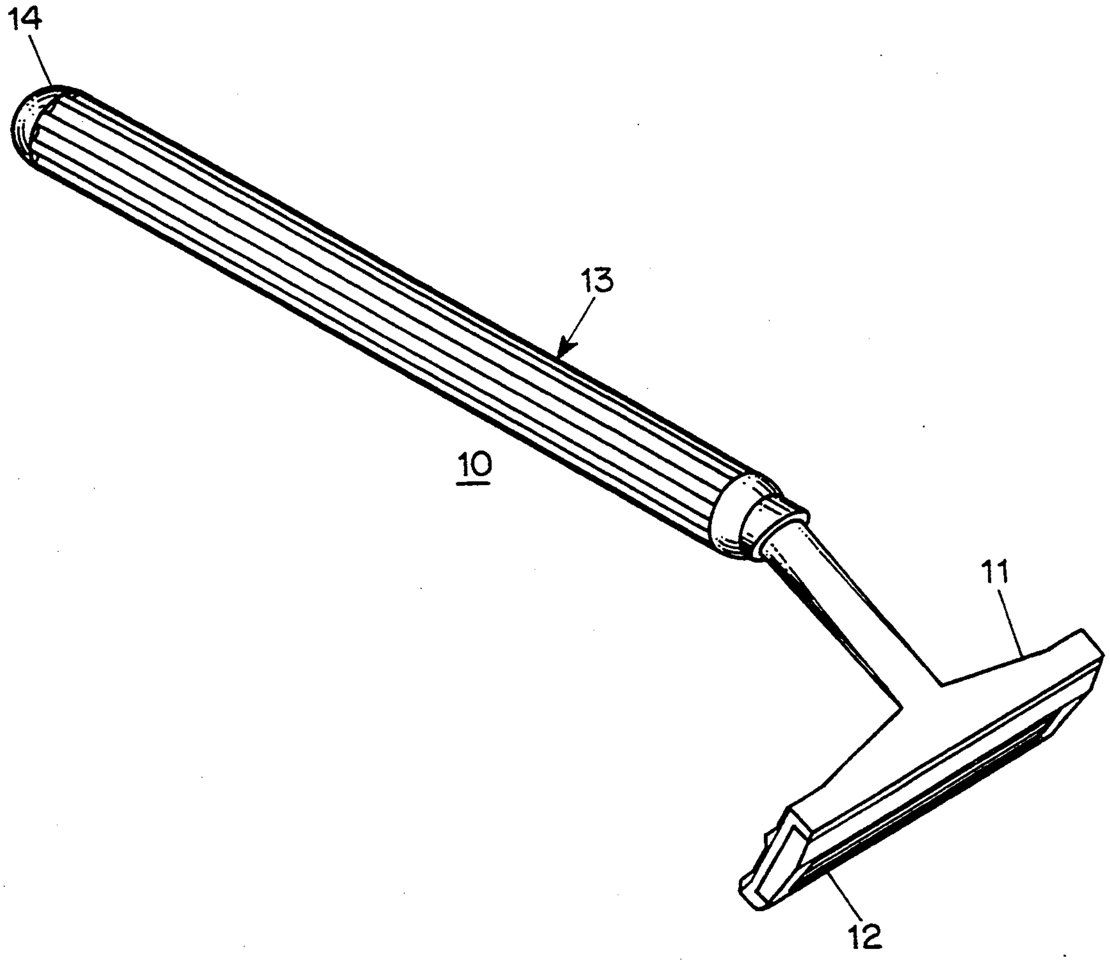
FIG. 1 is an isometric view of an exemplary disposable razor having a rubberized handle in accordance with the present invention.

Referring to FIG. 1, there is shown an exemplary disposable razor 10 in accordance with the invention. The razor 10 includes a molded plastic shaving head 11 attached to a rubberized plastic handle 13 having a molded plastic end cap 14. The shaving head 11, which may be of a conventional design, holds a pair of metal blades 12 with the edges thereof in appropriate positions for effective shaving. The shaving head 11 is advantageously tilted with respect to the handled 13 to provide a comfortable shaving angle.

Figure 2:
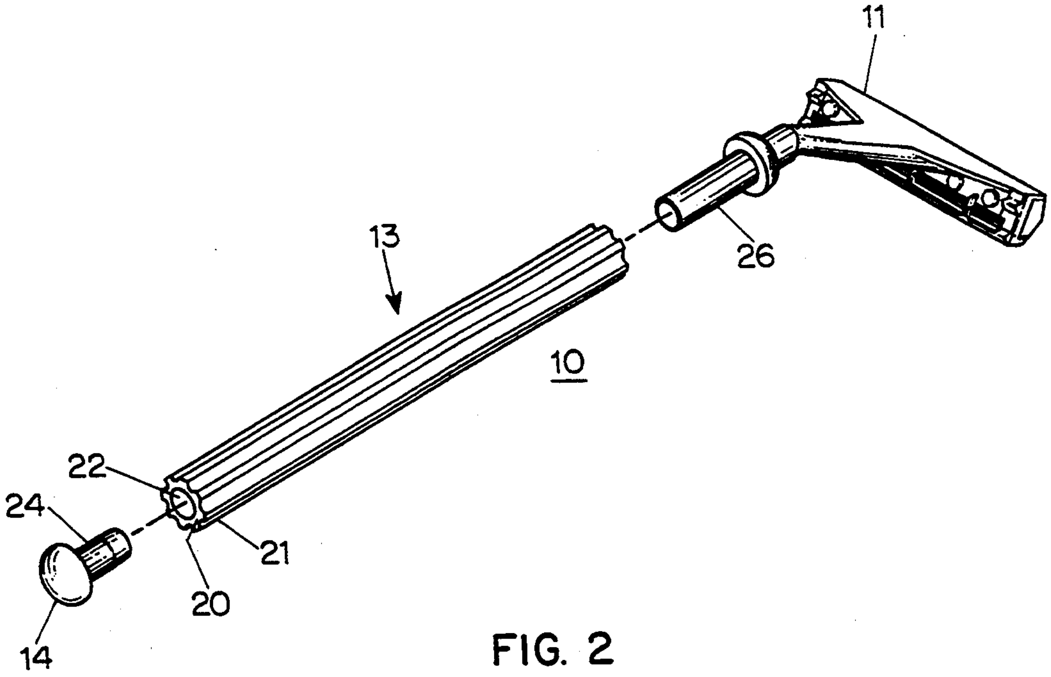
FIG. 2 is a partially exploded isometric view of the exemplary disposable razor of FIG. 1.

Turning now to FIG. 2, the handle 13 has a hollow rigid thermoplastic inner core 20 covered by a relatively thin, flexible layer 21 of coextruded thermoplastic rubber. Advantageously, the handle 13 is formed to have a generally cylindrical shape with longitudinal grooves or fluting, and a suitable length and diameter for easy grasp by the user. Those skilled in the art will recognize that suitable length and cross sectional dimension of the razor handle may vary over a wide range. The minimum wall thickness of the hollow thermoplastic inner core 20 of the handle 13 must be sufficient to provide the handle 13 with substantial rigidity, and will depend upon the characteristics of the thermoplastic material. In the exemplary embodiment the handle 13 has a length of 8.27 cm, a maximum diameter (including the thermoplastic rubber layer) of 0.95 cm and a minimum wall thickness (including the thermoplastic rubber layer) of 3 mils. Suitable thermoplastic materials for forming the rigid inner core 20 of the handle 13 include polyolefins (including polyethylenes, such as high density polyethylene and polypropylene), polyvinylidene chloride, and polystyrene. In the exemplary embodiment the thermoplastic material for forming the rigid inner core 20 of the handle 13 is polypropylene having a melt flow index of 1.2–4.0 g/10 minutes as measured according to the American Society of Testing Materials method D 1238.

The thermoplastic rubber layer on the handle 13, which may have any thickness capable of being formed by the coextrusion process described herein, provides the handle with a soft non-slippery feel, even when held by a wet and soapy hand. Advantageously, the thickness of the thermoplastic rubber layer is in the range of 0.075 mm to 3.0 mm.

The thermoplastic rubber covering layer 21 for the handle 13 must be formed with a material which is compatible with the thermoplastic of the rigid inner core 20 in that the thermoplastic rubber used must be coextrudable with the material of the inner core 20, and once coextruded, must also provide good adhesion with the inner core 20 so that the covering layer 21 does not become detached therefrom during use or storage. In order for the thermoplastic inner core material and thermoplastic rubber material to be coextrudable they should have appropriate melting points such that they are both in a molten state and have suitable viscosities while passing through a coextrusion die. For good adhesion, molecules of each material must mix and interweave to form a strong bond at the interface between the inner core and the thermoplastic layer. As is well known to those skilled in the art, if the materials chosen for the thermoplastic inner core and thermoplastic rubber covering layer do not mix and interweave to a sufficient extent at the interface to provide good adhesion, an appropriate tie layer may be formed between the inner core and the covering layer to provide the necessary adhesion. Such a tie layer may be coextruded with the inner core and covering layer using an appropriate coaxial extrusion die. In this manner, a thermoplastic inner core material and a thermoplastic covering layer material which are otherwise incompatible for forming the coextruded rubberized razor handle, in accordance with the invention, may be made compatible by using a tie layer.

Compatible thermoplastic rubber covering layer and thermoplastic inner core material combinations include an ethylene-propylene diene monomer rubber covering layer, such as Santoprene sold by Monsanto, Inc. of St. Louis, Mo., on a high density polyethylene inner core; a halogenated polyolefin covering layer, such as Alcryn sold by DuPont Polymer Products of Wilmington, Del., on a polyvinylidene chloride inner core; and a covering layer of a hydrogenated adduct of a styrene - butadiene block copolymer with maleic anhydride, such as Craton sold by Shell Chemical Company of Houston, Tex., on a polystyrene inner core. In the exemplary embodiment the thermoplastic rubber material for forming the covering layer 21 of the handle 13 is Santoprene.

Figure 3:
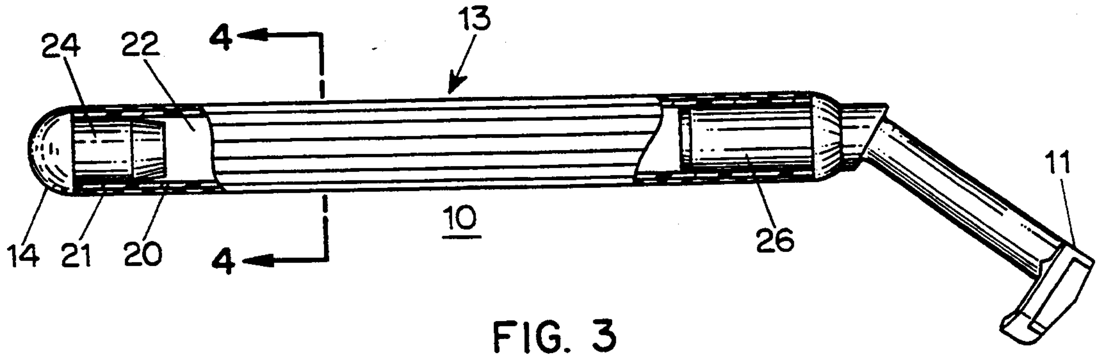
FIG. 3 is a partially sectional side view of the exemplary disposable razor of FIG. 1.

Referring now to FIG. 3, a shaving head 11 and the end cap 14 are advantageously formed to include respective cylindrical inserts 26 and 24, each size to fit into the hollow center portion 22 of the handle 13. In this manner, the shaving head 11 and the end cap 14 may each be attached to the handle 13 by press fitting the respective inserts 26 and 24 into the ends of the handle 13. If desired, glue or other adhesive agents may be used to further secure the cylindrical inserts 26 and 24 in the respective hollow ends of the handle 13. It is noted that the handle of the disposable razor in accordance with the invention need not be hollow, and the shaving head and the end cap, if any, may be attached to the handle by means other than the press-fitted inserts, as will be known to those skilled in the art.

Figure 4:
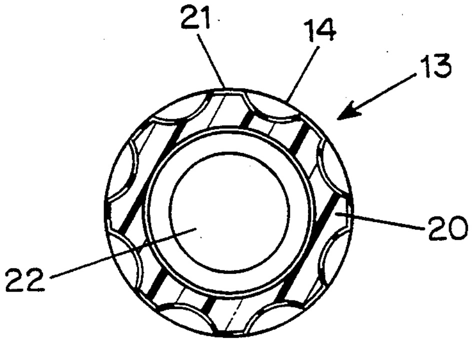
FIG. 4 is a cross-sectional view of the handle of the exemplary disposable razor of FIG. 1 taken along section line 4—4 of FIG. 3.
Figure 5:
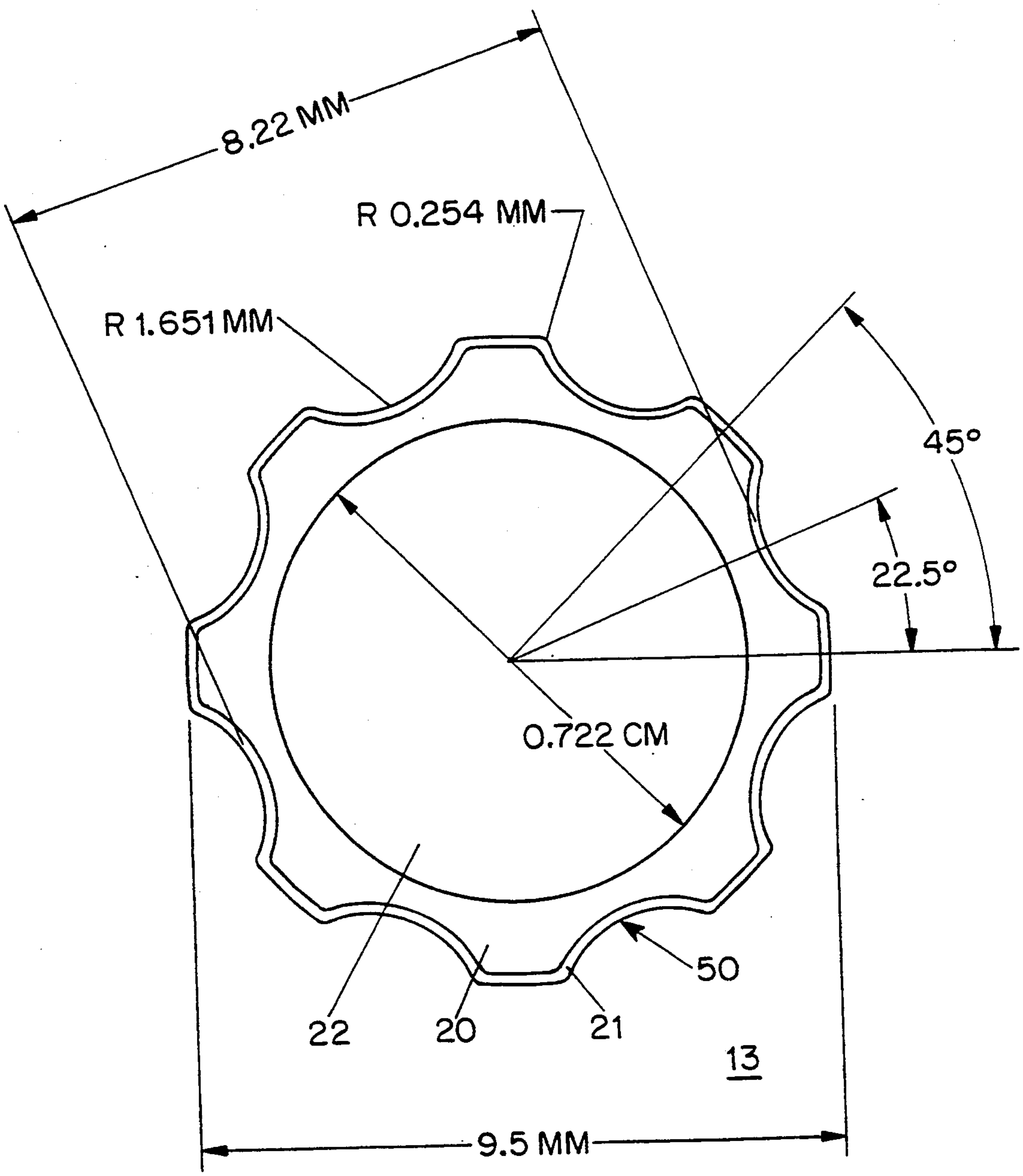
FIG. 5 is a cross-sectional view of the handle of the exemplary disposable razor of FIG. 1 showing the dimensions thereof.

As shown in FIG. 4 and in greater detail in FIG. 5, the handle 13 of the exemplary embodiment of the disposable razor 10 is formed to have a cylindrical fluted shape with cross-sectional dimensions as shown in FIG. 5.

Figure 6:
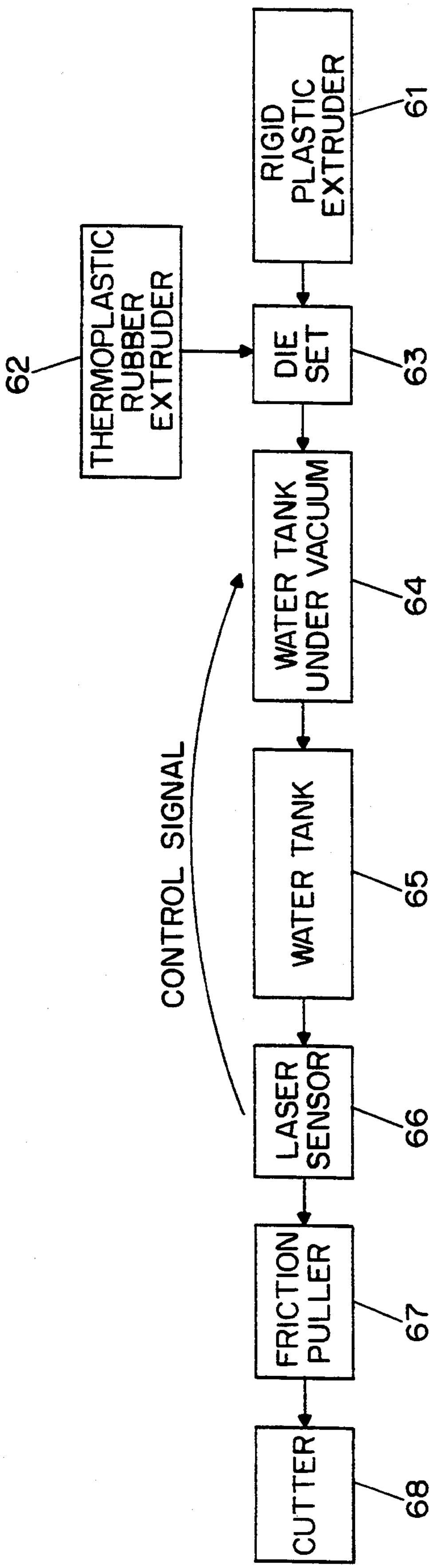
FIG. 6 is a schematic block diagram illustrative of an exemplary process, in accordance with the invention, for fabricating the handle of the exemplary disposable razor of FIG. 1.

Turning now to FIG. 6, there is shown a block diagram 60 schematically illustrating the process for fabricating the rubberized handle 13 of the disposable razor 10. Separate conventional extruders 61 and 62 are respectively used to simultaneously extrude the thermoplastic of the rigid inner core 20 and the compatible thermoplastic rubber of the covering layer 21 of the handle 13. The outputs of the extruders 61 and 62 are provided to a dual input coaxial die set 63 of known design. The parameters of the extrusions depend upon the materials selected for the inner core and the covering layer, and are known or readily determinable by those skilled in the art. For example, when coextruding a polypropylene inner core and a Santoprene covering layer, the polypropylene is extruded at a temperature of approximately 450° and a pressure of approximately 1000 psi, while the Santoprene is extruded at a temperature of approximately 350° F. and a pressure of approximately 1000 psi.

The coaxial extruder die set 63 is separately heated to a temperature of approximately 400° F. The coextrudate exiting from the die set 63 is first cooled in a first water tank 64 which is under vacuum, such as a Conair Gatto DPC Vacuum Tank, and then further cooled in a second water tank 65, such as a Conair Gatto Water Tank, at atmospheric pressure.

The coextrudate after passing through the second water tank 65 is sensed by a conventional laser beam detection arrangement 66 which provides a control signal to the vacuum control system of the vacuum water tank 64 to control the air pressure above the cooling water therein. In the vacuum water tank 64, which may be a Conair Gatto DPC Vacuum Tank, the air pressure above the cooling water in the tank controls the diameter of the extrudate passing through the tank. The vacuum control system of the vacuum water tank 64 responds to the control signal from the laser beam detection arrangement 66 to raise or lower the air pressure above cooling water in the tank. A commercially available friction puller 67, such as the Conair Gatto Cat-A-Puller Model 205-4, moves the coextrudate through a cutter 68 of known design, such as a Conair Gatto Cutter. The cutter 68 cuts the length of the coextrudate moving therethrough to segments of preset length. In this manner, a rubberized handle 13 of the disposable razor 10 is formed by a simple, low-cost coextrusion process.

While the invention has been described in terms of the foregoing specific embodiment thereof, it will be apparent to those skilled in the art that various alterations and modifications may be made to the described embodiment without departing from the scope of the invention, as defined by the appended claims. For example, the handle 13 of the disposable razor 10 need not have the fluted cylindrical cross-sectional shape of the exemplary embodiment, but may have any cross-sectional shape which is capable of being formed by coextrusion of a rigid thermoplastic and a compatible thermoplastic rubber.

I claim:

1. A method for producing a disposable razor having a rubberized handle comprising the steps of:

forming a shaving head having at least one razor blade held in appropriate shaving position;

feeding a substantially rigid thermoplastic in an extrudable state to a coaxial extruder die;

simultaneously feeding a thermoplastic rubber compatible with said substantially rigid thermoplastic in an extrudable state to said coaxial extruder die;

coextruding said substantially rigid thermoplastic and said compatible thermoplastic rubber to form a one-piece razor handle having an inner core of said substantially rigid thermoplastic covered by a layer of said compatible thermoplastic rubber; and attaching said shaving head to said one-piece, coextruded razor handle.

2. A method according to claim 1 wherein the step of feeding the substantially rigid thermoplastic in an extrudable state includes extruding the substantial rigid thermoplastic, and the step of simultaneously feeding the thermoplastic rubber in an extrudable state includes extruding the thermoplastic rubber.

3. A method according to claim 2 wherein said substantially rigid thermoplastic is extruded at a temperature of approximately 450° F. and a pressure of approximately 1000 psi, and said thermoplastic rubber is extruded at a temperature of approximately 350° F. and a pressure of approximately 1000 psi.

4. A method according to claim 3 wherein said coaxial extruder die is heated to a temperature of approximately 400° F.

* * * * *